United States Patent
Dighe et al.

(10) Patent No.: US 10,125,604 B2
(45) Date of Patent: Nov. 13, 2018

(54) DOWNHOLE ZONAL ISOLATION DETECTION SYSTEM HAVING CONDUCTOR AND METHOD

(71) Applicants: Shailesh Shashank Dighe, Katy, TX (US); Antonio Bottiglieri, Houston, TX (US); Andrew Christopher Holley, Conroe, TX (US); Li Li, Spring, TX (US)

(72) Inventors: Shailesh Shashank Dighe, Katy, TX (US); Antonio Bottiglieri, Houston, TX (US); Andrew Christopher Holley, Conroe, TX (US); Li Li, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 248 days.

(21) Appl. No.: 14/924,611

(22) Filed: Oct. 27, 2015

(65) Prior Publication Data

US 2017/0114631 A1    Apr. 27, 2017

(51) Int. Cl.
| | |
|---|---|
| E21B 47/12 | (2012.01) |
| E21B 17/00 | (2006.01) |
| E21B 17/10 | (2006.01) |
| E21B 33/14 | (2006.01) |
| E21B 47/00 | (2012.01) |
| G01V 11/00 | (2006.01) |

(52) U.S. Cl.
CPC .......... *E21B 47/122* (2013.01); *E21B 17/003* (2013.01); *E21B 17/1021* (2013.01); *E21B 17/1078* (2013.01); *E21B 33/14* (2013.01); *E21B 47/0005* (2013.01); *G01V 11/002* (2013.01)

(58) Field of Classification Search
CPC .... E21B 47/112; E21B 17/003; G01V 11/002
See application file for complete search history.

(56) References Cited

U.S. PATENT DOCUMENTS

| | | | |
|---|---|---|---|
| 5,226,332 | A | 7/1993 | Wassell |
| 6,131,658 | A | 10/2000 | Minear |
| 6,192,983 | B1 | 2/2001 | Neuroth et al. |
| 7,152,685 | B2 | 12/2006 | Adnan et al. |
| 7,287,684 | B2 | 10/2007 | Blackburne, Jr. |
| 8,964,504 | B2 | 2/2015 | Chace et al. |
| 2002/0113716 | A1* | 8/2002 | Aiello .................. E21B 17/003 340/853.1 |
| 2004/0040707 | A1* | 3/2004 | Dusterhoft ............ E21B 17/206 166/279 |
| 2004/0262013 | A1 | 12/2004 | Tilton et al. |
| 2005/0231382 | A1 | 10/2005 | Richardson |

(Continued)

OTHER PUBLICATIONS

McNicoll, A. et al., "Liquid lights and musical posters: Welcome to the world of electric paint"; www.cnn.com, 2013, 2 pages.

(Continued)

*Primary Examiner* — Matthew R Buck
*Assistant Examiner* — Aaron L Lembo
(74) *Attorney, Agent, or Firm* — Cantor Colburn LLP (57) ABSTRACT

A downhole system includes a tubular having a longitudinal axis, and a conductive trace applied on the tubular. The conductive trace is configured to deliver a signal between uphole and downhole locations of the tubular.

22 Claims, 5 Drawing Sheets

(56) References Cited

U.S. PATENT DOCUMENTS

| | | | |
|---|---|---|---|
| 2006/0151179 A1* | 7/2006 | Boyadjieff | E21B 17/003 |
| | | | 166/380 |
| 2009/0166087 A1 | 7/2009 | Braden et al. | |
| 2011/0024103 A1* | 2/2011 | Storm, Jr. | E21B 17/206 |
| | | | 166/65.1 |
| 2011/0309949 A1* | 12/2011 | Dopf | E21B 17/003 |
| | | | 340/854.6 |
| 2012/0132007 A1 | 5/2012 | Dria et al. | |
| 2016/0111183 A1* | 4/2016 | Mast | B32B 1/00 |
| | | | 385/107 |
| 2017/0114608 A1* | 4/2017 | Dighe | E21B 33/12 |

OTHER PUBLICATIONS

International Search Report for International Application No. PCT/US20161054605; dated Dec. 22, 2016; 7 pages.
Written Opinion of the International Search Report for International Application No. PCT/US2016/054605; dated Dec. 22, 2016; 11 pages.

* cited by examiner

DOWNHOLE ZONAL ISOLATION DETECTION SYSTEM HAVING CONDUCTOR AND METHOD

BACKGROUND

In the drilling and completion industry, the formation of boreholes for the purpose of production or injection of fluid is common. The boreholes are used for exploration or extraction of natural resources such as hydrocarbons, oil, gas, water, and alternatively for CO2 sequestration. Downhole production boreholes utilized in subterranean operations typically utilize casings disposed therein, along with zonal isolation material which may be cement in some cases, to protect the borehole from downhole pressures, chemical reactions and other conditions and prevent failures such as borehole collapse, burst, and tensile failures. Casing can also be used to define production zones in various portions of the borehole.

Casing and zonal isolation material monitoring and evaluation techniques are important tools in maintaining the integrity of the zonal isolation, and in turn maintaining the integrity of the borehole. Evaluation and maintenance procedures involve interrogating the casing and cement that is used to bond the casing to a borehole wall to determine whether voids are present between the casing and the borehole wall. Well logging tools are utilized to make the interrogation, such as wireline tools that convey an interrogator inside of the casing to the location for interrogation. Such wireline tools require personnel to deliver the tool for interrogation and retrieve the tool subsequent completion of an interrogation operation. Interpretation of the log may then be occur.

The art would be receptive to alternative devices and methods for casing, zonal isolation monitoring and improvements to casings.

BRIEF DESCRIPTION

A downhole system includes a tubular having a longitudinal axis, and a conductive trace applied on the tubular. The conductive trace is configured to deliver a signal between uphole and downhole locations of the tubular.

A method of signal transmission along a downhole tubular includes positioning the tubular within a borehole, and delivering a signal along a conductive trace applied on the tubular.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
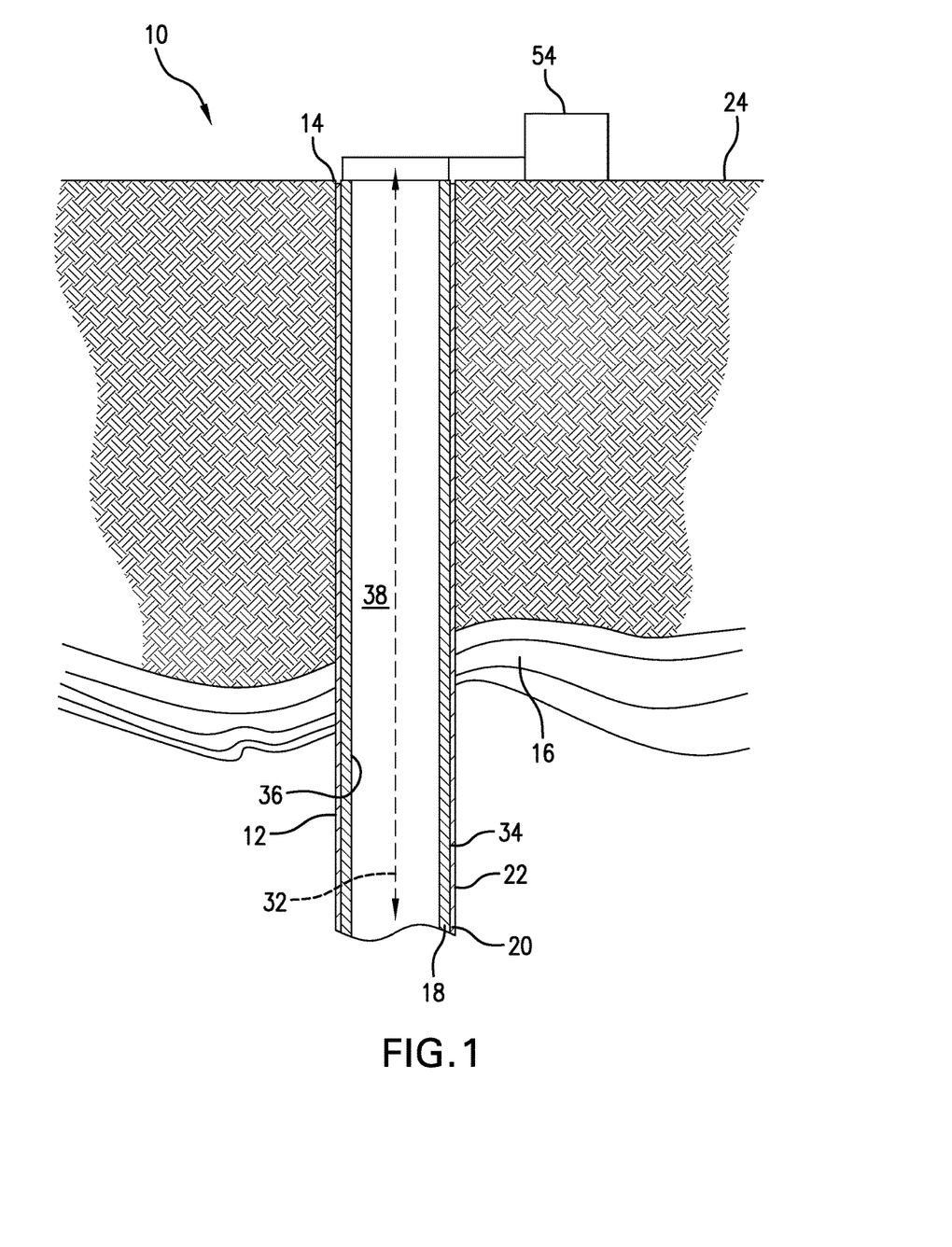
FIG. 1 depicts a side sectional view of an embodiment of a tubular signal transmission system in a borehole.

Referring to FIG. 1, one embodiment of a tubular signal transmission system 10 is shown to include a tubular 18 disposed in a borehole 14, the borehole 14 having a borehole wall 12. In the embodiment illustrated in FIG. 1, the tubular 18 is employed as a casing. The borehole 14 penetrates at least one earth formation 16 during a subterranean operation. As described herein, a "formation" refers to the various features and materials that may be encountered in a subsurface environment and surround the borehole 14. While the borehole 14 is illustrated as extending substantially vertically from the surface 24, it should be understood that the borehole 14 may additionally include portions that extend in directions deviating from vertical, including but not limited to portions that extend parallel or substantially parallel to the surface 24 to form a horizontal well. The tubular 18 when employed as a casing may be cemented or bonded to the borehole wall 12 via a casing support material 20 such as, but not limited to, cement 22 or any other zonal isolation material that includes any suitable cementing or other material or combination of materials sufficient to bond the tubular 18 to the borehole wall 12, facilitate the tubular 18 in supporting and/or isolating portions of the borehole 14, or otherwise support the tubular 18. In one embodiment, the casing support material 20 is cement 22. The cement 22 may include a material or mixture that is forced into a space between the tubular 18 and the borehole wall 12 and serves to bond the tubular 18 to the borehole wall 12 to form a cement sheath surrounding the tubular 18. The casing support material 20 may further include one or more expandable packers (not shown) as an alternative to or in addition to the cement 22, as well as any other suitable bonding agent for the type of formation 16 through which the borehole 14 extends. While the system 10 is useful in operations with a cemented or otherwise bonded tubular 18, the application of the tubular 18 is not limited to any particular casing support material 20 when employed as a casing, and the tubular 18 may also be employed in other downhole operations requiring a tubular.

The tubular 18 is made from any material suitable for withstanding downhole conditions such as pressure, temperature and chemical reaction. Non-limiting examples of such materials include steel, heat treated carbon steel, stainless steel, aluminum, titanium, fiberglass and other materials. In one embodiment, the tubular 18 includes a plurality tubular sections 30, such as pipe segments or casing joints, connected together via threaded ends or threaded joints or other connection mechanisms to achieve a sufficient length for the borehole 14, and the tubular 18 may extend any length of the borehole 14. For example, the borehole 14 may include a full tubular 18 extending from a surface 24 or near surface location to a selected depth or a liner such as a production liner that is suspended in the borehole 14.

Figure 2:
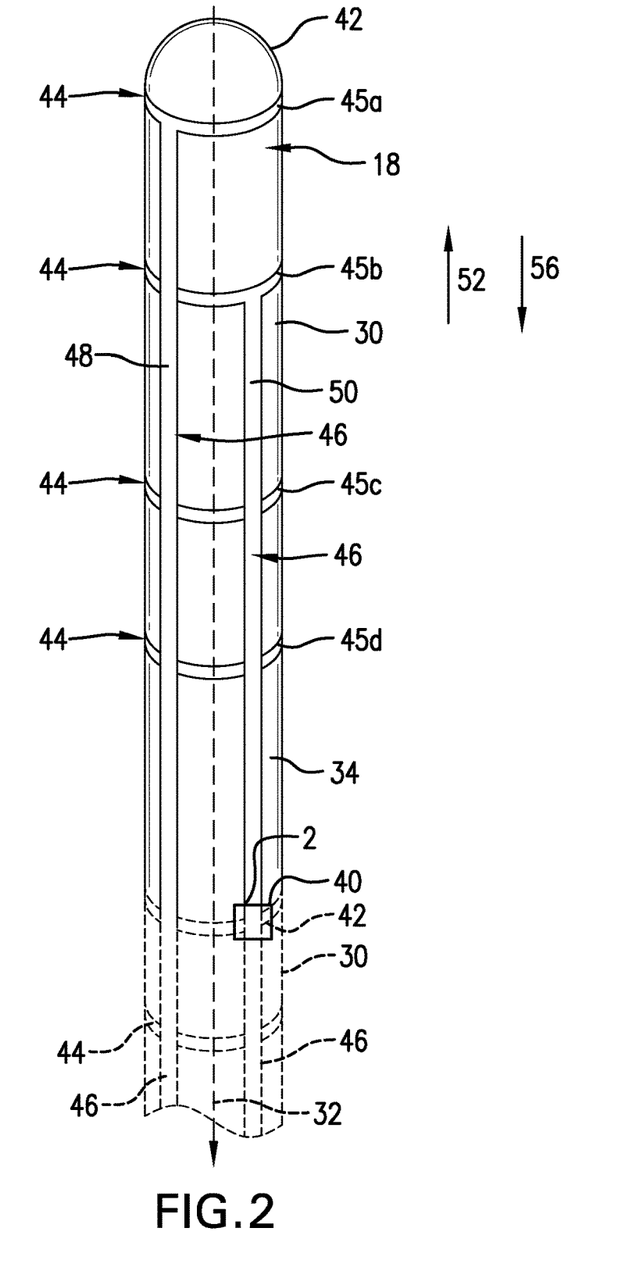
FIG. 2 depicts a perspective view of an embodiment of sections of a tubular within the tubular signal transmission system.

FIG. 2 depicts an embodiment of a tubular section 30 of the tubular 18, with one adjacent tubular section 30 shown in phantom. The tubular 18 may include a plurality of tubular sections 30 to make up the full length of the tubular 18. The tubular section 30 extends along a longitudinal axis 32 and includes an exterior surface 34, which faces the casing support material 20 and borehole wall 12 (FIG. 1) when used as a casing, and an interior surface 36 defining a flowbore or space 38 for receiving a production string or other downhole tools (not shown). Each tubular section 30 includes a first end 40, such as a downhole end, and a second end 42, such as an uphole end. The tubular section 30 may be attached to one or more tubular sections 30, or interconnecting joints may be utilized to connect adjacent tubular sections 30 together. The tubular section 30 includes one or more conductive connectors 44, such as conductive rings that, in one embodiment, encircle the exterior surface 34 of the tubular section 30. In the illustrated embodiment, four conductive connectors 44 are provided on the tubular section 30, such as first, second, third, and fourth conductive connectors 45a, 45b, 45c, and 45d. The conductive connectors 44 may occupy distinct longitudinal areas of the tubular section 30. That is, adjacent conductive connectors 44 may be longitudinally separated from each other. The tubular section 30 further includes at least two longitudinally extending conductive traces 46, that may, in one embodiment, be painted or printed on the exterior surface 34 and are respectively electrically connected to conductive connectors 44, respectively, but not to each other in the wellbore. That is, in the illustrated embodiment, a first conductive trace 48 is electrically connected to the first conductive connector 45a but not the second conductive connector, and a second conductive trace 50 is electrically connected to the second conductive connector 45b but not the first conductive connector. In one embodiment, third and fourth conductive traces (not shown) may be electrically connected to the third and fourth conductive connectors 45c and 45d. The conductive traces 46 serve as signal conductors for the system 10. The conductive traces 46 may also occupy distinct radial areas of the tubular section 30. That is, adjacent conductive traces 46 are radially separated from each other. While only two conductive traces 46 are illustrated, the tubular 18 may include more than two conductive traces 46 radially dispersed about the exterior surface 34. The number of conductive traces 46 is only dependent on the width and number of the conductive traces 46 and the circumference of the tubular 18. The conductive traces 46 include at least the first conductive trace 48 and the second conductive trace 50, and the first and second conductive traces 48, 50 may have different lengths along the tubular section 30 such that the first and second conductive traces 48, 50 extend to different depths when installed within the borehole 14. For example, the first conductive trace 48 extends further into the borehole 14 (and further from the surface 24) than the second conductive trance 50. When more than two conductive traces 46 are included, they may all extend at different lengths along the tubular section 30. In some tubular sections 30, at least one of the first and second conductive traces 48, 50 extends to the first end 40 to connect with a conductive trace 46 or conductive connector 44 on an adjacent tubular section 30 connected to the first end 40, and at least one of the first and second conductive traces 48, 50 extends to the second end 42 to connect with a conductive trace 46 or conductive connector 44 on an adjacent tubular section 30 connected to the second end 42. The conductive traces 46 are aligned correctly with conductive traces 46 on adjacent tubular section 30 during makeup of the tubular 18 to assure continuity in signal transmission along the length of the tubular 18.

In one embodiment, the conductive traces 46 allow collection/transmission of data regarding cement condition at various depths and transmit the data to the surface by the conductive traces 46 via signals in an uphole direction 56. By providing varying depths in which the conductive traces 46 extend within the borehole 14, measurements can be taken by looking at values across two conductive traces 46 at different depths, such as first and second conductive traces 48, 50. The conductive traces 46 are respectively electrically connected to the conductive connectors 44, which may also be conductive traces. When the conductive connectors 44 are ring shaped as illustrated, the connectors 44 are able to obtain data all around the circumference of the tubular 18, at the depths at which they are positioned, rather than from just one radial location of the tubular 18. The connection between the conductive connectors 44 and their respective conductive traces 46 allows the conductive traces 46 to transmit signals obtained from the connectors 44 to the surface 24. Changes in electrical properties in the cement 22 over time from placement onwards can be analyzed, to determine state of cement (liquid, gel, solid) and if there is any damage to the cement 22 or if there are any fluid invasions in the annulus between the exterior surface 36 of the tubular 18 and the borehole wall 12. A control system 54 is schematically illustrated at the surface 24 to receive, store, analyze and/or relay any signals transmitted by any of the conductive traces 46 disposed on the tubular 18. The control system 54 may also or alternatively relay the signals to a remote location for further processing. Because the conductive traces 46 and conductive connectors 44 are always in place, data can be collected continuously for the life of the well and in real time. Alternatively, or additionally, the control system 54 may be used to direct signals in a downhole direction 52 along one or a plurality of the conductive traces 46, such as for downhole power transmission.

Figure 3:
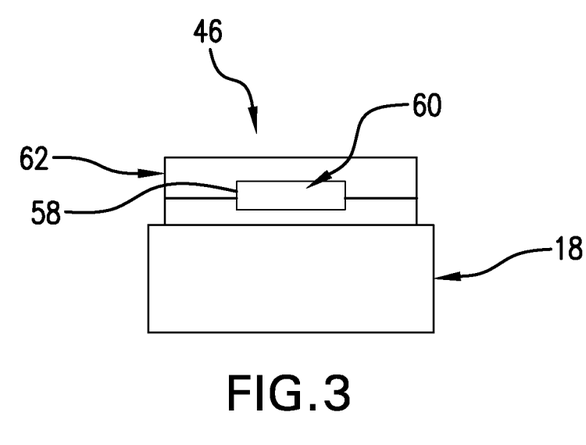
FIG. 3 depicts an enlarged and sectional view of area 2 within FIG. 2.

With reference to FIG. 3, each of the conductive traces 46 is formed using a conductive material 58. The conductive material 58 may include materials such as paint or ink or film applied to the tubular 18, or may alternatively be etched onto the tubular 18. The conductive connectors 44 also include a conductive material 58 applied or etched onto the tubular 18. The conductive material 58 may include, but is not limited to, copper, silver, and graphite-based paint or ink, or any other conductive particles or powders, or combination of conductive particles or powders, mixed with a paintable or printable medium which can be applied to the tubular 18. In one embodiment, the conductive material 58 is formed from a material, such as a paint or ink, that changes from a liquid state to a solid state. The conductive material 58 includes at least a conductive core 60. The conductive traces 46 may further include a non-conductive portion 62 applied over the conductive core 60, or alternatively the non-conductive portion 62 may be part of the conductive material 58 which is applied concurrently with the conductive core 60. For example, a paintable medium can be selected which allows the conductive core 60 to settle therein, leaving an isolating non-conductive portion 62 covering the conductive core 60. Alternatively, the conductive traces 46 may be formed using a two-stage process by first applying the conductive material 58 onto the tubular 18, and then applying a non-conductive material on top of the conductive material 58. Some of the non-conductive material 58 may also be used to electrically isolate a conductive trace 46 from a conductive connector 44, if the conductive trace 46 and connector 44 are not to be electrically connected.

Figure 4:
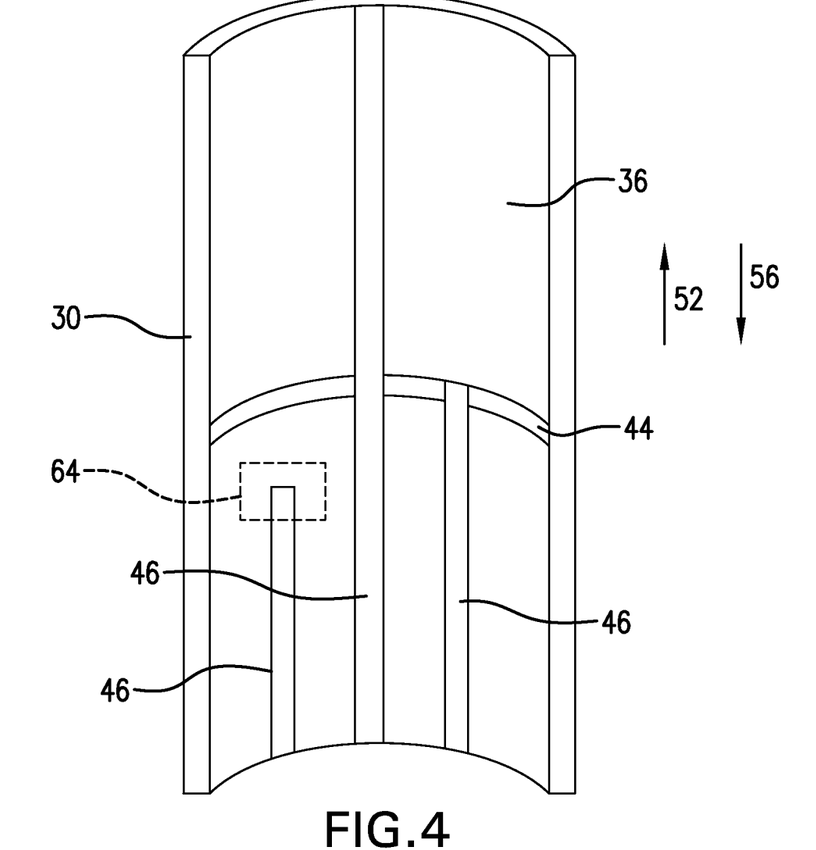
FIG. 4 depicts a perspective and cut-away view of a portion of an embodiment of a tubular section for the tubular signal transmission system; and, FIG. 5 depicts a schematic view of an embodiment of a centralizer on a tubular within the tubular signal transmission system.

By applying the conductive traces 46 and conductive connectors 44 onto the exterior surface 36 of the tubular 18, as illustrated in FIG. 2, the conductive traces 46 and conductive connectors 44 are positioned at locations interfacing directly with both the tubular 18 as well as the casing support material 20. In an another embodiment, as shown in FIG. 4, the conductive traces 46 and conductive connectors 44 may be painted, printed, or etched onto the interior surface 44 of the tubular sections 30. Interiorly applied conductive traces 46 may be particularly useful in a power transmission application where power may be supplied to downhole tools 64, such as sensors or other devices, provided within the flowbore 38 (FIG. 1) of the tubular 18. In such an application, the conductive trace 46 designated for power signal delivery in the downhole direction 56 need not be electrically connected to any conductive connectors 44. The interiorly applied conductive traces 46 may also be used to transmit signals in the uphole direction 56 as previously described. The tubular section 30 may include any combination of conductive traces 46 and conductive connectors 44 applied on one or both the interior surface 36 and the exterior surface 34.

Figure 5:
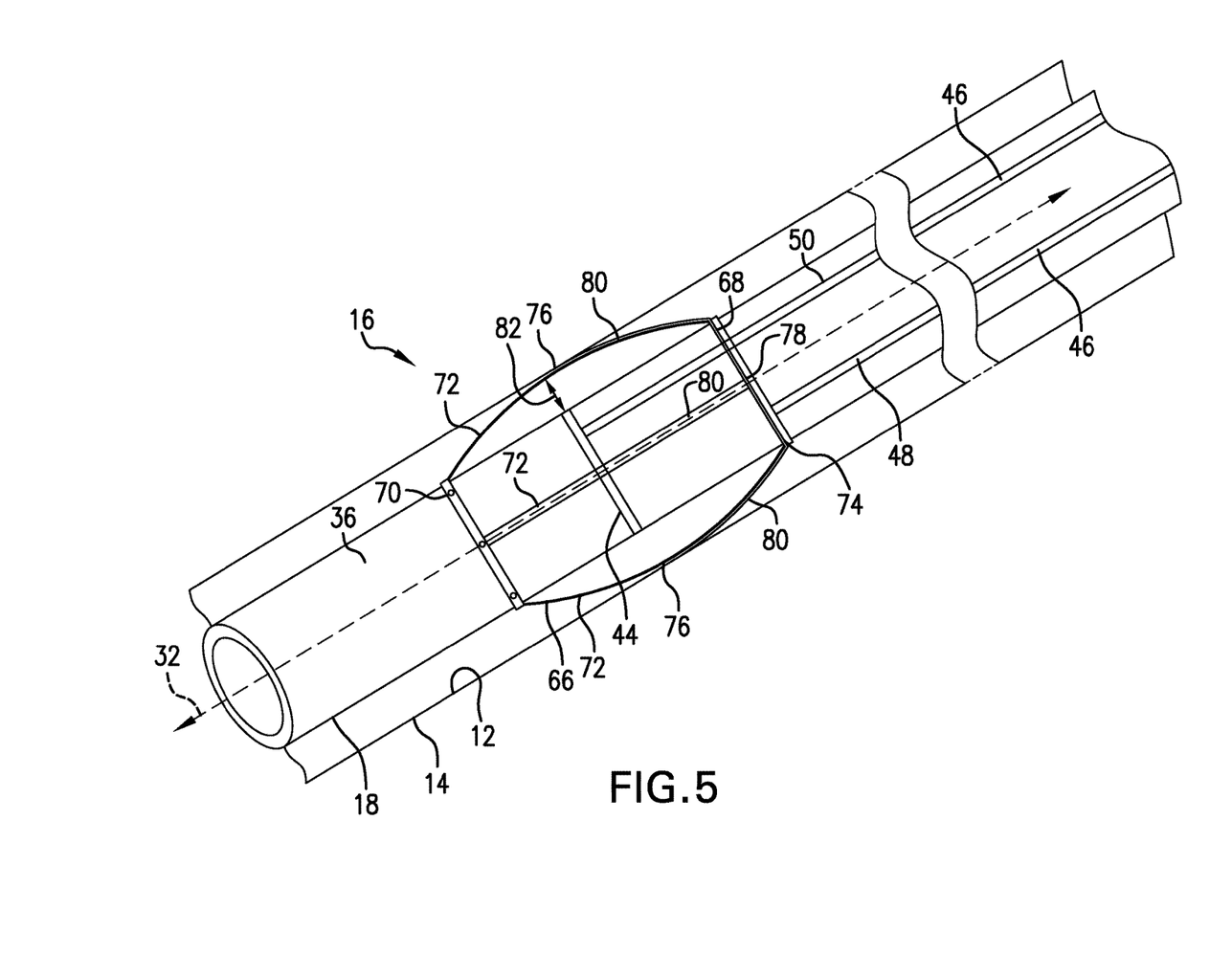

Another embodiment of utilizing the tubular 18 with conductive traces 46 formed from conductive material 58 is shown in FIG. 5. The tubular 18, defining any downhole piping or casing, is shown within the borehole 14, and spaced from the borehole wall 12 (or from another tubular 18) by a centralizer 66 disposed on the exterior surface 36 of the tubular 18. The centralizer 66 may include ends defined by a first ring 68 and a second ring 70, each disposed about the exterior surface 36 of the tubular 18. The centralizer 66 may further include a plurality of expandable spacers 72 which interconnect the first ring 68 and the second ring 70 and which help space the tubular 18 from the borehole wall 12 (or from another tubular 18). The spacers 72 may lie substantially flat against the exterior surface 36 during run-in of the tubular 18 into the borehole 14, and then the centralizer 66 may be set into place using any know mechanical, electrical, or hydraulic actuator to expand the spacers 72 into the bowed position shown in FIG. 5, such as by reducing the distance between the first and second rings 68, 70, to centralize the tubular 18 within the borehole 14. As in the previous embodiments, conductive traces 46 are applied on the tubular 18, and in the illustrated embodiment, the conductive traces 46 are applied on the exterior surface 36 of the tubular 18, although additional conductive traces 46 may additionally be applied on the interior surface 36 of the tubular 18 as required. At least one conductive connector 44 is also applied on the tubular 18, and at a location along the tubular 18 that is longitudinally disposed within an area encompassed by the centralizer 66, between the first and second rings 68, 70. At least one of the conductive traces 46, such as second conductive trace 50, extends to the conductive connector 44. Also, at least one of the conductive traces 46, such as first conductive trace 48, is electrically connected to a third conductive trace 74 applied on the centralizer 66. In particular, the third conductive trace 74 includes a first portion 78 applied along the first ring 68 and one or second portions 80 applied along at least a portion of at least one of the spacers 72. As shown, the second portions 80 of the third conductive trace 74 are applied on approximately half the length of each of the spacers 72. Ends 76 of the second portions 80 of the third conductive trace 74 located on the spacers 72 may be left exposed. That is, the ends 76 may be uncovered by a non-conductive portion 62. The ends 76 of the third conductive trace 74 are substantially longitudinally aligned with the conductive connector 44 when the centralizer 66 is in the set position shown in FIG. 5. The conductive connector 44 continuously provides data regarding a distance 82 between the tubular 18 and the borehole wall 12 (or interior surface of another tubular 18) by detecting the electrical properties 82 between the conductive connector 44 and the ends 76 of the third conductive trace 74 positioned on the centralizer 66. The electrical properties 82 between additional centralizers (not shown) and the borehole wall 12 may be determined using additional conductive traces 46 on the exterior surface 36 that extend further longitudinally past the first and second conductive traces 48, 50 and centralizer 66. The embodiment shown in FIG. 5 may additionally be employed with cement 22 where the centralizers 66 allow for higher degree of resolution in the thickness of the cement sheath. The embodiment of the tubular 18 including a centralizer 66 may be used alone or in combination with the embodiments previously described with respect to FIGS. 1-4. That is, the tubular 18 may include conductive traces 46 disposed on any or all of the exterior surface 34, interior surface 36, and centralizer 66.

Unlike a conductive cable that would have to be assembled onto a tubular 18 during the make-up of the tubular 18 on the surface 24 by personnel, the conductive material 58 for the conductive traces 46 and conductive connectors 44 can be applied offsite during the manufacture of the tubular sections 30. By completely eliminating the additional step of attaching a cable to the tubular 18 during make-up at the site, savings in time and money are realized. Also, the threat of having an attached conductive cable knocked off or broken during installation into a borehole is eliminated. Additionally, the conductive material 58 can be applied substantially flush with either surface 34, 36, and therefore very little space is utilized, leaving more room for other downhole necessities such as cement 22, downhole tools and devices 64, and interior tubulars 18.

Monitoring of the sheath of cement 22 and the tubular 18 can occur in real-time and span from the initial physical placement of the tubular 18 into the borehole 14 throughout the entire life of the well or the life of the components within the well. The conductive traces 46 can serve as transmission lines to transmit any sort of signals including sensed signals indicative of cement quality, which are sent in the uphole direction 52. Additionally, the conductive traces 46 are capable of receiving data signals that are deliverable in the downhole direction 56. Since the conductive traces 46 include a metallic conductive core 60, the conductive traces 46 are additionally capable of transferring power, unlike fiber optics.

Thus, embodiments described herein enable operators to analyze the condition and state of cement 22 based on measuring the change in electrical properties across two conductive traces 46. The proposed method includes utilizing a set of conductive traces 46 that are pre-applied on the tubular 18 (interior surface 36 or exterior surface 34) and aligned correctly during tubular makeup to provide a tubular signal transmission system 10. The conductive traces 46 allow an operator to collect electrical measurements from various depths and by plotting them over time and referencing them to laboratory measurements, the condition of the cement 22 can be determined. Additional methods of analyzing the cement 22 can also include utilization of conductive traces 46 on the centralizer 66. These methods allow real time continuous monitoring of the sheath of cement 22 in the borehole 14. The methods also allow operators to study/measure or evaluate the cement properties across the thickness of the cement 22. These methods eliminate the necessity of wireline that needs to run into the tubular 18 and eliminates substantial surface equipment and additional personnel. Embodiments described herein further allow power transmission along conductive traces 46. Further, when the control system 54 includes or is connected to a remote data transmitter, multiple wells may be monitored remotely thus allowing for better analysis by experts while requiring less operators to support operation.

Set forth below are some embodiments of the foregoing disclosure:

Embodiment 1

A downhole system including: a tubular having a longitudinal axis; and, a conductive trace applied on the tubular, the conductive trace including a conductive material, the conductive trace configured to deliver a signal between uphole and downhole locations of the tubular.

Embodiment 2

The downhole device of embodiment 1, wherein the conductive trace includes at least one of a conductive paint or a conductive ink or a conductive film.

Embodiment 3

The downhole system of embodiment 1, further comprising a downhole device, the conductive trace configured to deliver a power signal to the downhole device.

Embodiment 4

The downhole system of embodiment 3, wherein the downhole device is a sensor.

Embodiment 5

The downhole system of embodiment 1, wherein the tubular is formed of a plurality of tubular sections, a portion of the conductive trace applied on each tubular section, the tubular sections connected together to align and electrically connect ends of adjacent conductive trace portions to each other.

Embodiment 6

The downhole system of embodiment 1, wherein the conductive trace is a first conductive trace amongst a plurality of conductive traces applied on the tubular, and further comprising a second conductive trace amongst the plurality of conductive traces, the second conductive trace radially spaced from the first conductive trace.

Embodiment 7

The downhole system of embodiment 6, further comprising a first conductive connector electrically connected to the first conductive trace and applied on the tubular, and a second conductive connector electrically connected to the second conductive trace and applied on the tubular.

Embodiment 8

The downhole system of embodiment 7, wherein the first and second conductive connectors are ring-shaped.

Embodiment 9

The downhole system of embodiment 7, wherein the first and second conductive traces are covered by a non-conductive layer and the first and second conductive connectors are uncovered.

Embodiment 10

The downhole system of embodiment 7, further comprising a sheath of cement surrounding the tubular and the first and second conductive connectors.

Embodiment 11

The downhole system of embodiment 6, wherein the first and second conductive traces extend substantially parallel to the longitudinal axis of the tubular.

Embodiment 12

The downhole system of embodiment 6, further comprising a control system in receipt of electrical signals from at least one of the plurality of conductive traces.

Embodiment 13

The downhole system of embodiment 6, wherein the first and second conductive traces have different lengths.

Embodiment 14

The downhole system of embodiment 6, wherein the downhole system is disposable in a borehole extending from a surface, and the first conductive trace extends further from the surface than the second conductive trace.

Embodiment 15

The downhole system of embodiment 6, wherein the conductive traces are painted or printed on an exterior surface of the tubular.

Embodiment 16

The downhole system of embodiment 6, further comprising a centralizer disposed on an exterior surface of the tubular, the plurality of conductive traces further comprising a third conductive trace electrically connected to the first conductive trace and extending along at least one spacer of the centralizer.

Embodiment 17

The downhole system of embodiment 16, further comprising a conductive connector connected to the second conductive trace and substantially longitudinally aligned with an end of the third conductive trace on the at least one spacer, the conductive connector positioned substantially between ends of the centralizer.

Embodiment 18

A method of signal transmission along a downhole tubular, the method comprising: positioning the tubular within a borehole; and, delivering a signal along a conductive trace applied on the tubular.

Embodiment 19

The method of embodiment 18, wherein delivering a signal includes delivering a power signal in a downhole direction to a downhole device electrically connected to the conductive trace.

Embodiment 20

The method of embodiment 18, further comprising cementing the tubular within the borehole, wherein the conductive trace includes first and second conductive traces extending at different depths within the borehole and along an exterior surface of the tubular, and delivering the signal includes delivering electrical signals in an uphole direction indicative of condition of cement.

Embodiment 21

The method of embodiment 18, further comprising deploying a centralizer to centralize the tubular within the borehole, the conductive trace including first and second conductive traces extending along an exterior surface of the tubular, the centralizer including a third conductive trace applied along at least one spacer of the centralizer and electrically connected to the first conductive trace, a conductive connector connected to the second conductive trace and substantially longitudinally aligned with an end of the third conductive trace on the at least one spacer, the conductive connector positioned substantially between ends of the centralizer, the method further including detecting a space between the end of the third conductive trace and the conductive connector.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A downhole system including:
   a tubular having a longitudinal axis;
   a first conductive trace applied on the tubular; and
   a second conductive trace applied on the tubular, the second conductive trace not electrically connected to the first conductive trace, each conductive trace including a conductive material, and each conductive trace configured to deliver a signal between uphole and downhole locations of the tubular;
   wherein the conductive traces are painted, etched, or printed on at least one of an exterior surface and an interior surface of the tubular.

2. The downhole device of claim 1, wherein each conductive trace includes at least one of a conductive paint or a conductive ink or a conductive film.

3. The downhole system of claim 1, further comprising a downhole device, the first conductive trace configured to deliver a power signal to the downhole device.

4. The downhole system of claim 3, wherein the downhole device is a sensor.

5. The downhole system of claim 1, wherein the tubular is formed of a plurality of tubular sections, a portion of the first conductive trace applied on each tubular section, the tubular sections connected together to align and electrically connect ends of adjacent conductive trace portions of the first conductive trace to each other.

6. The downhole system of claim 1, further comprising a first conductive connector electrically connected to the first conductive trace and applied on the tubular, and a second conductive connector electrically connected to the second conductive trace and applied on the tubular.

7. The downhole system of claim 6, wherein the first and second conductive connectors are ring-shaped.

8. The downhole system of claim 6, wherein the first and second conductive traces are covered by a non-conductive layer and the first and second conductive connectors are uncovered.

9. The downhole system of claim 6, further comprising a sheath of cement surrounding the tubular and the first and second conductive connectors.

10. The downhole system of claim 1, wherein the first and second conductive traces are radially spaced from each other.

11. The downhole system of claim 1, further comprising a control system in receipt of electrical signals from at least one of the plurality of conductive traces.

12. The downhole system of claim 1, wherein the first and second conductive traces have different lengths.

13. The downhole system of claim 1, wherein the downhole system is disposable in a borehole extending from a surface, and the first conductive trace extends further from the surface than the second conductive trace.

14. The downhole system of claim 1, further comprising a centralizer disposed on an exterior surface of the tubular, the plurality of conductive traces further comprising a third conductive trace electrically connected to the first conductive trace and extending along at least one spacer of the centralizer.

15. The downhole system of claim 14, further comprising a conductive connector connected to the second conductive trace and substantially longitudinally aligned with an end of the third conductive trace on the at least one spacer, the conductive connector positioned substantially between ends of the centralizer.

16. A method of signal transmission along a downhole tubular, the method comprising:
positioning the downhole system of claim 1 within a borehole; and,
delivering signals respectively along the conductive traces.

17. The method of claim 16, wherein delivering the signals includes delivering a power signal in a downhole direction to a downhole device electrically connected to the first conductive trace.

18. The downhole system of claim 1, wherein the first and second conductive traces are separated from each other about a circumference of the tubular.

19. A downhole system including:
a tubular having a longitudinal axis;
a first conductive trace applied on the tubular; and
a second conductive trace applied on the tubular, the second conductive trace not electrically connected to the first conductive trace, each conductive trace including a conductive material, and each conductive trace configured to deliver a signal between uphole and downhole locations of the tubular;
wherein the conductive traces are painted or printed on an exterior surface of the tubular.

20. A method of signal transmission along a downhole tubular, the method comprising:
positioning the tubular within a borehole;
cementing the tubular within the borehole, and,
delivering a signal along a conductive trace applied on the tubular;
wherein the conductive trace includes first and second conductive traces extending at different depths within the borehole and along an exterior surface of the tubular, and delivering the signal includes delivering electrical signals in an uphole direction indicative of condition of cement.

21. The method of claim 20, further comprising deploying a centralizer to centralize the tubular within the borehole, the centralizer including a third conductive trace applied along at least one spacer of the centralizer and electrically connected to the first conductive trace, a conductive connector connected to the second conductive trace and substantially longitudinally aligned with an end of the third conductive trace on the at least one spacer, the conductive connector positioned substantially between ends of the centralizer, the method further including detecting a space between the end of the third conductive trace and the conductive connector.

22. A downhole system including:
a tubular having a longitudinal axis;
a conductive trace applied on a surface of the tubular, the conductive trace including a conductive material and covered by a non-conductive layer, the conductive material is painted, etched, or printed on the surface of the tubular, and the conductive trace is configured to deliver a signal between uphole and downhole locations of the tubular; and,
a conductive connector electrically connected to the conductive trace and uncovered by the non-conductive layer, the conductive connector configured to obtain data from around a circumference of the tubular.

* * * * *